(12) United States Patent
Wiliams

(10) Patent No.: US 9,878,342 B2
(45) Date of Patent: Jan. 30, 2018

(54) INFLATABLE SUPPORT STRUCTURE SYSTEM

(71) Applicant: Thomas Wiliams, Montgomery, TX (US)

(72) Inventor: Thomas Wiliams, Montgomery, TX (US)

( * ) Notice: Subject to any disclaimer, the term of this patent is extended or adjusted under 35 U.S.C. 154(b) by 141 days.

(21) Appl. No.: 14/328,693

(22) Filed: Jul. 10, 2014

(65) Prior Publication Data

US 2015/0017338 A1    Jan. 15, 2015

Related U.S. Application Data

(60) Provisional application No. 61/852,226, filed on Jul. 10, 2013.

(51) Int. Cl.
| | |
|---|---|
| *B05B 15/12* | (2006.01) |
| *B05D 5/00* | (2006.01) |
| *E04H 1/12* | (2006.01) |
| *E04H 5/02* | (2006.01) |
| *E04H 15/20* | (2006.01) |
| *B60R 13/01* | (2006.01) |

(52) U.S. Cl.
CPC ...... *B05B 15/1214* (2013.01); *B05B 15/1222* (2013.01); *B05B 15/1296* (2013.01); *B05D 5/00* (2013.01); *E04H 1/1205* (2013.01); *E04H 5/02* (2013.01); *E04H 15/20* (2013.01); *B60R 13/01* (2013.01); *E04H 2015/201* (2013.01)

(58) Field of Classification Search
None
See application file for complete search history.

(56) References Cited

U.S. PATENT DOCUMENTS

| | | | | |
|---|---|---|---|---|
| 2002/0185064 | A1* | 12/2002 | Shutic | B05B 15/1211 118/309 |
| 2003/0187082 | A1* | 10/2003 | Scherba | E04H 15/20 521/30 |
| 2010/0272915 | A1* | 10/2010 | Laws | B05B 15/1214 427/421.1 |

* cited by examiner

*Primary Examiner* — Nathan T Leong
(74) *Attorney, Agent, or Firm* — Bushman Werner, P.C.

(57) ABSTRACT

An improved mobile paint booth system and method for applying paint to a vehicle is herein disclosed. An improved mobile paint booth can comprise a plurality of vertical supports, a base support, a first upper beam, and a second upper beam. The plurality of vertical supports can comprise a corner support at each corner, and a middle support along a first wall. The base support can be substantially in the shape of a "U" that can connect each of the vertical supports. The base of the "U" can be along the bottom of the first wall. The first upper beam that can connect a first set of the corner support and the middle support. The second upper beam that can connect a second set of the corner support.

7 Claims, 18 Drawing Sheets

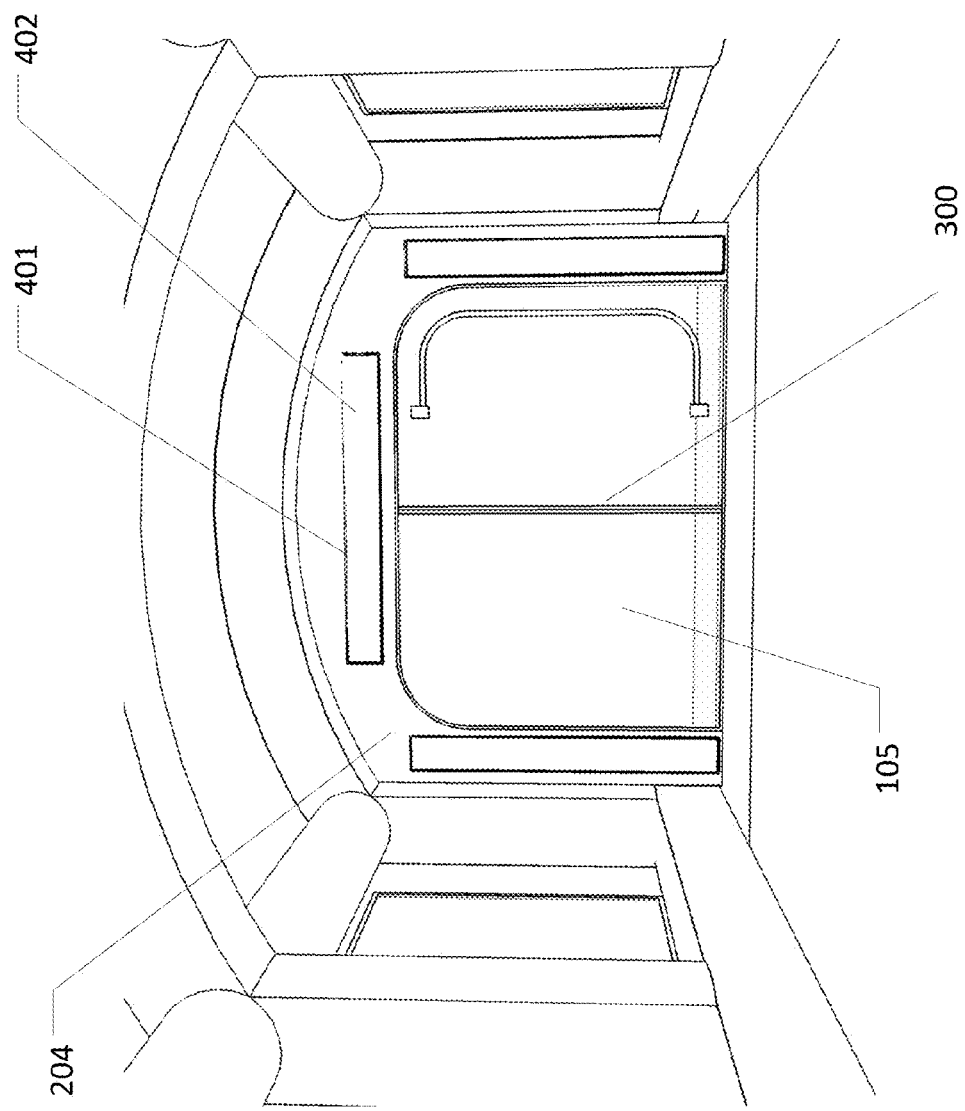

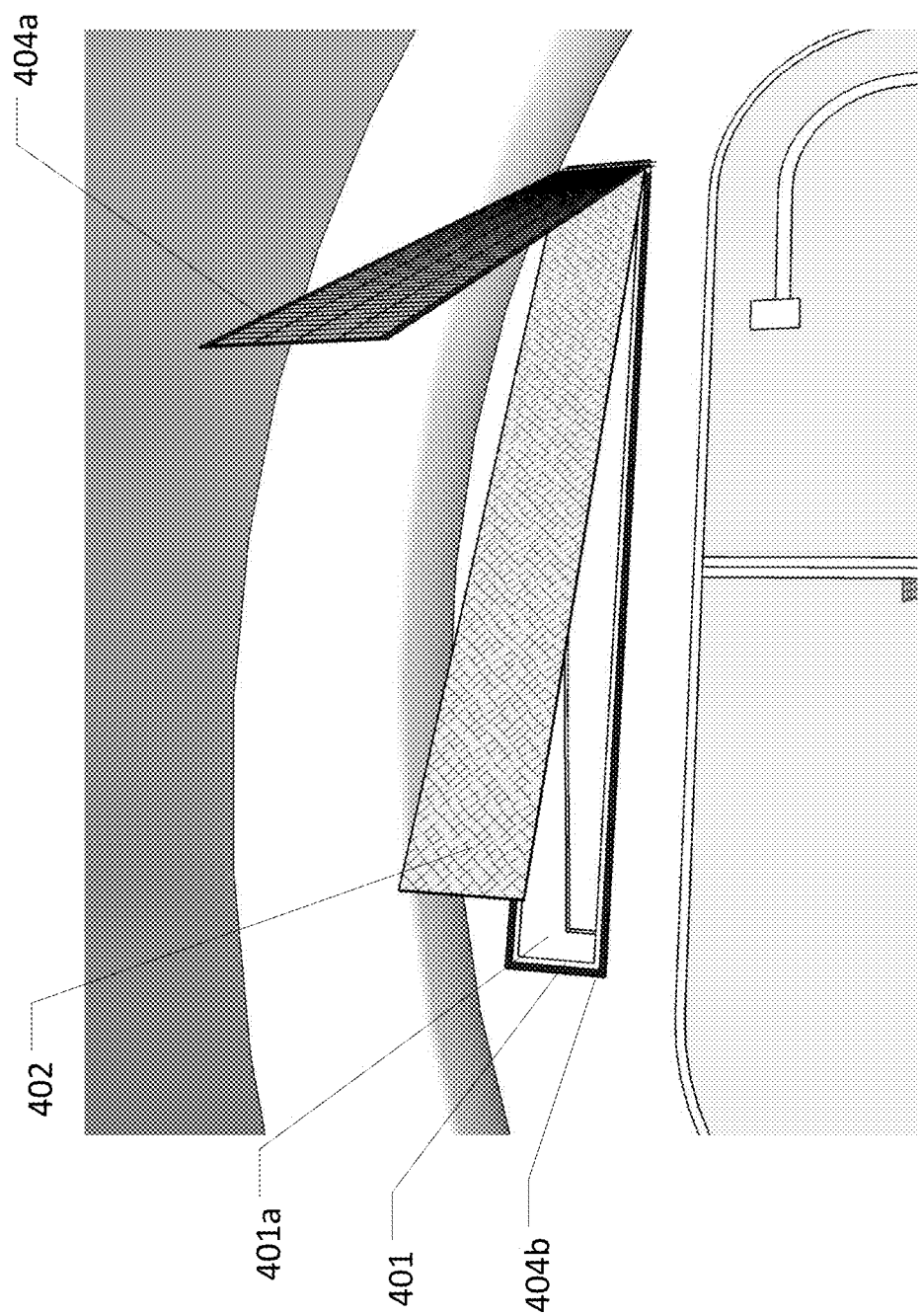

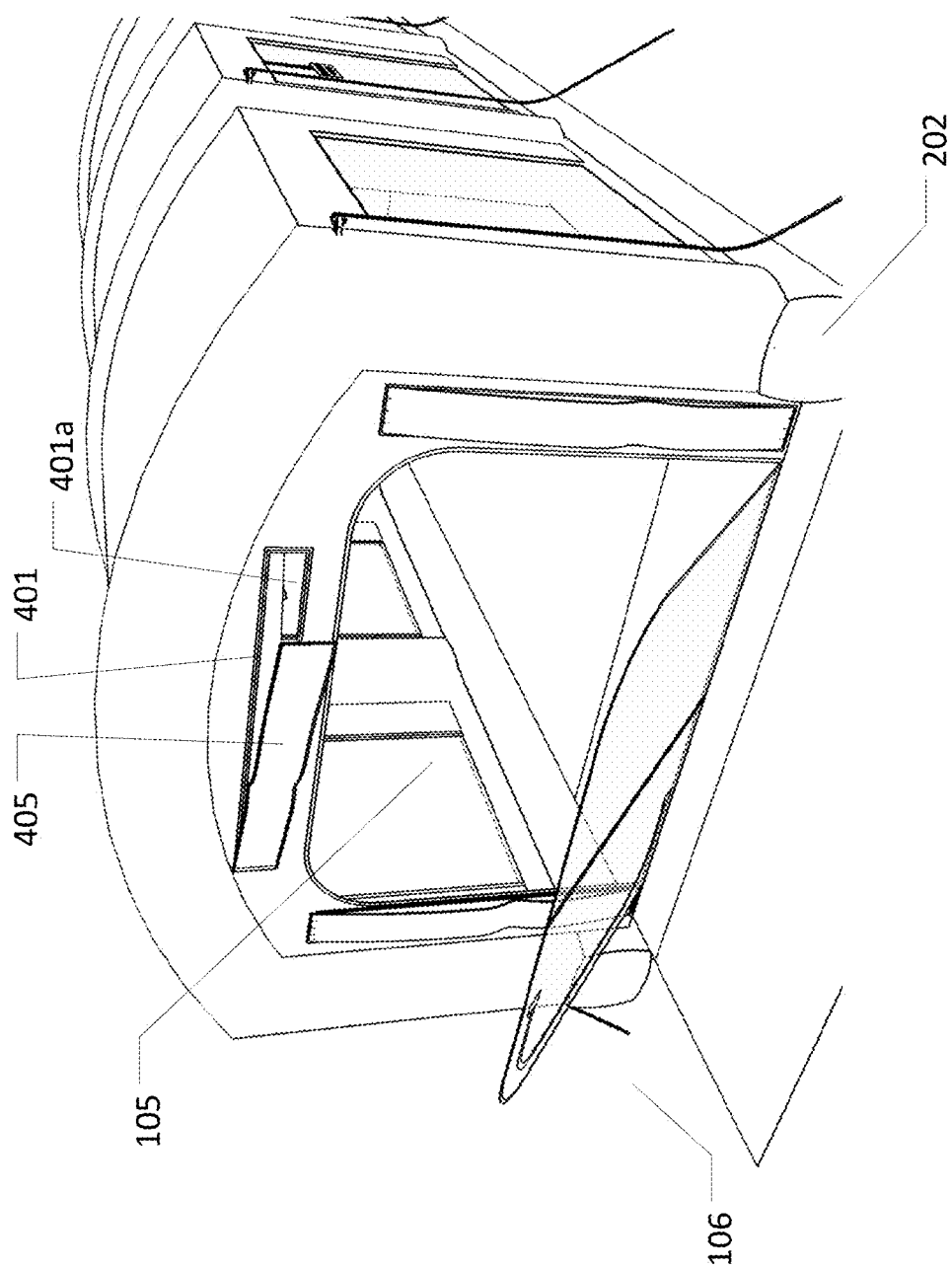

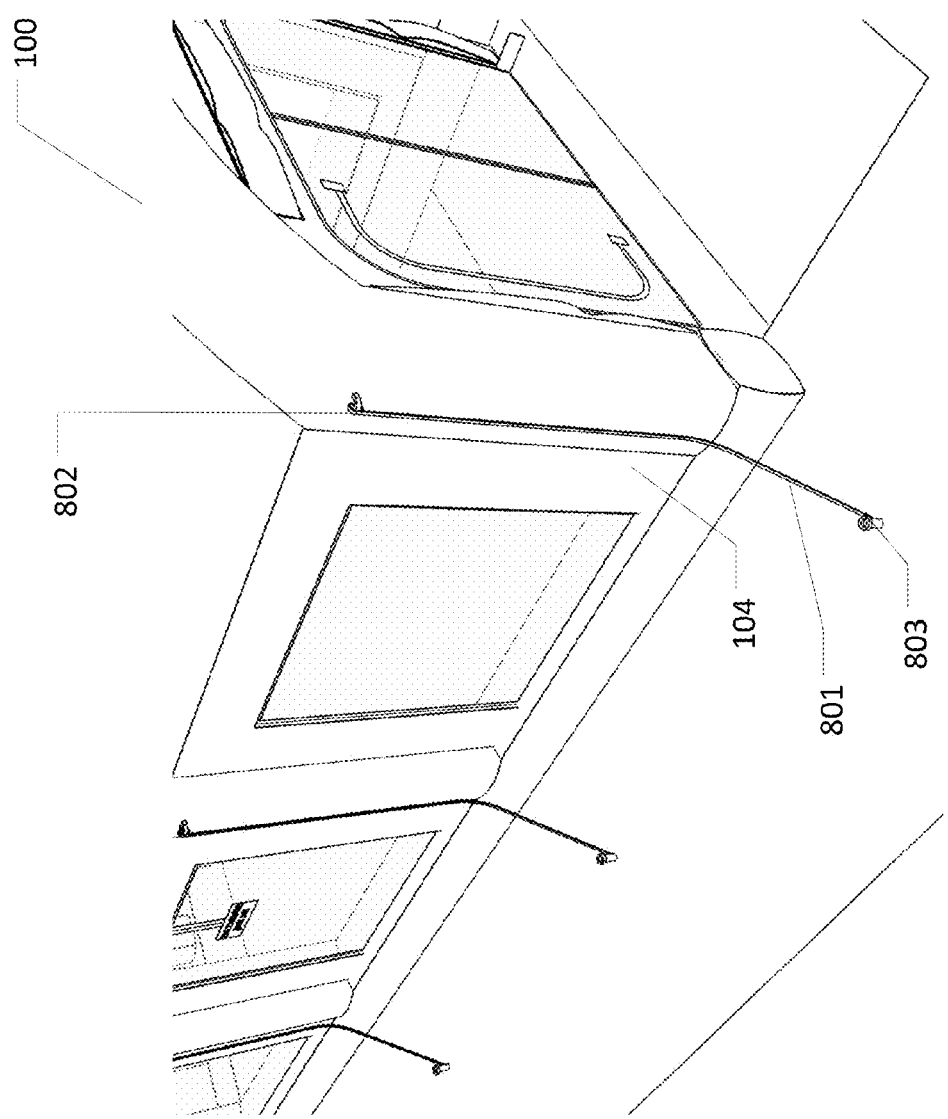

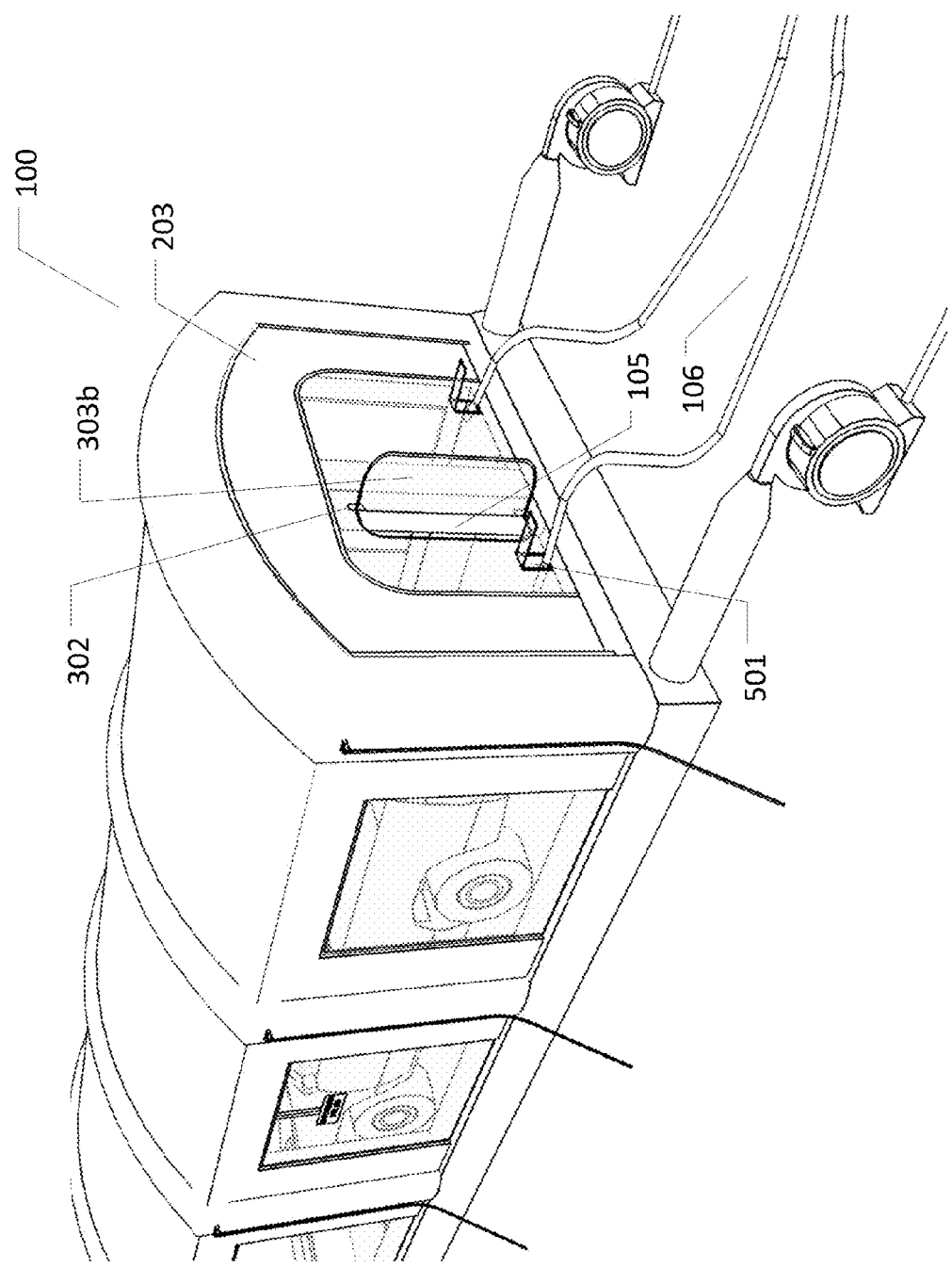

INFLATABLE SUPPORT STRUCTURE SYSTEM

BACKGROUND

This disclosure relates to an improved mobile paint booth system and method for applying paint to a vehicle.

When used car dealerships purchase used automobiles, often the used automobile has basic wear and tear such as scratches. A low cost solution to this problem is to apply paint to a car, however due to environmental and other concerns, the paint must be applied in an enclosed space. Larger dealerships with an expansive fleet often have an enclosed space on their lot dedicated to making such repairs. However, smaller lots with smaller resources often do not have such facilities. Instead, they must send each car to an outside facility. However, such process puts mileage on the car, increases the time that the car must be away from the lot, requires additional man-hours moving the car, and therefore makes the process of applying the paint more expensive. As such it would be useful to have an improved mobile paint booth system and method for applying paint to a vehicle.

SUMMARY

An improved mobile paint booth system and method for applying paint to a vehicle is herein disclosed. An improved mobile paint booth can comprise a plurality of vertical supports, a base support, a first upper beam, and a second upper beam. The plurality of vertical supports can comprise a corner support at each corner, and a middle support along a first wall. The base support can be substantially in the shape of a "U" that can connect each of the vertical supports. The base of the "U" can be along the bottom of the first wall. The first upper beam that can connect a first set of the corner support and the middle support. The second upper beam that can connect a second set of the corner support.

An improved mobile paint booth method for applying paint to a vehicle is further disclosed. The method can comprise the step of inflating a mobile paint booth. The mobile paint booth can comprise a plurality of vertical supports, a base support, a first upper beam, and a second upper beam. The plurality of vertical supports can comprise a corner support at each corner, and a middle support along a first wall. The base support can be substantially in the shape of a "U" that can connect each of the vertical supports. The base of the "U" can be along the bottom of the first wall. The first upper beam that can connect a first set of the corner support and the middle support. The second upper beam that can connect a second set of the corner support.

BRIEF DESCRIPTION OF THE DRAWINGS

FIG. 4A illustrates one or more exhaust panels mounted on wall section.

FIG. 4C illustrates the inner surface of second wall comprising exhaust panel.

FIG. 4D illustrates an external view of exhaust panels comprising a flap.

FIG. 8 illustrates an external view of mobile paint booth comprising a plurality of ropes.

FIG. 9F illustrates external view of first wall comprising second door and orifices.

DETAILED DESCRIPTION

Described herein is an improved mobile paint booth system and method for applying paint to a vehicle. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
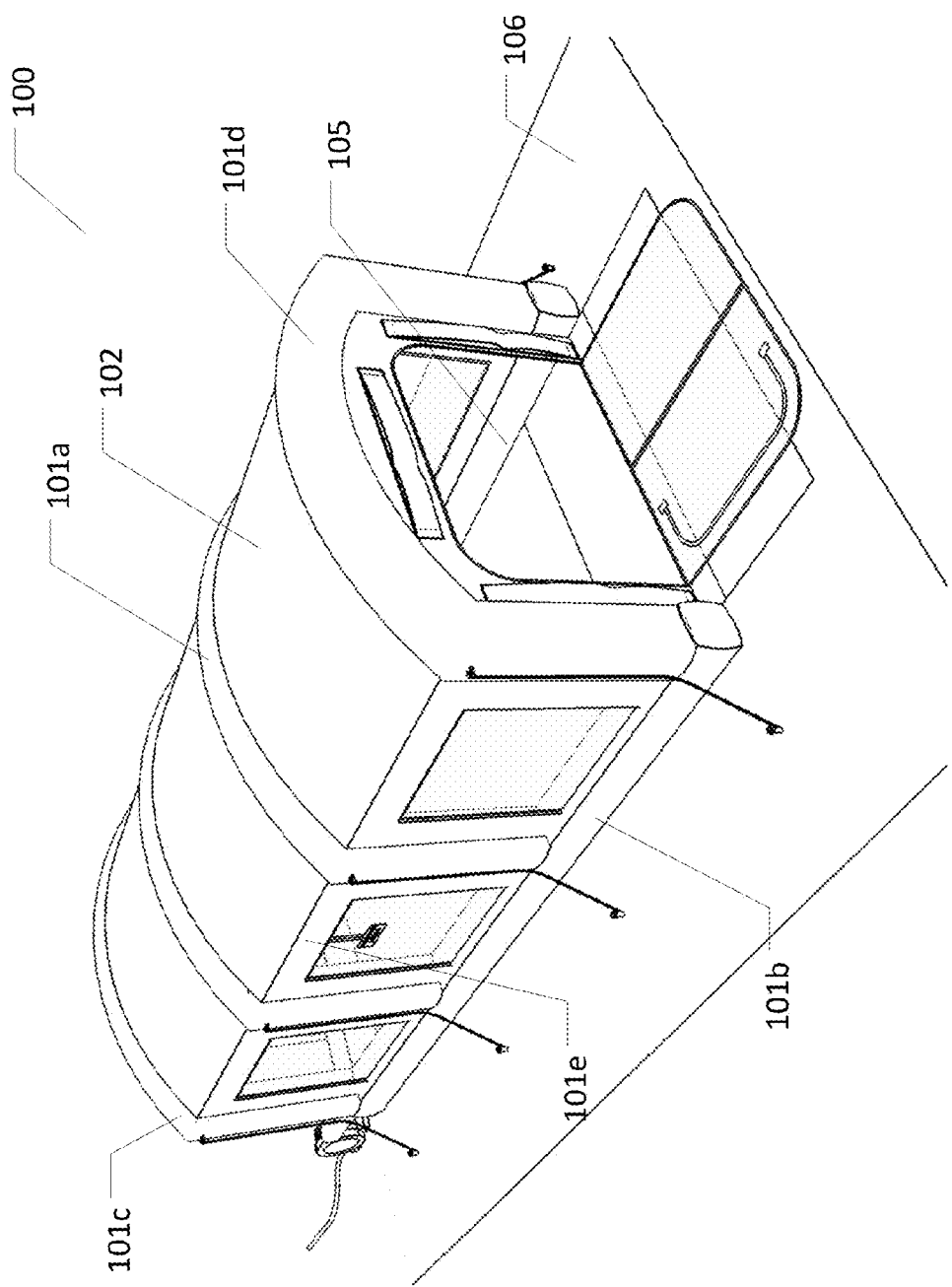
FIG. 1 illustrates an inflatable booth such as an mobile paint booth.

FIG. 1 illustrates an inflatable booth such as an mobile paint booth 100. In one embodiment mobile paint booth 100 can comprise an inflatable frame 101, a roof 102, a floor 103, and a plurality of wall sections 104. Mobile paint booth 100 can be an inflatable booth that provides an enclosed space for automotive paint repairs. Moreover, mobile paint booth 100 can prevent chemicals used in automotive paint repairs from being released outside mobile paint booth 100. Additionally, mobile paint booth 100 can prevent any solid particles from the outer surroundings to contaminate the paint that is being applied to an automobile. As such, applying the paint within mobile paint booth 100 can produce a better and smooth coating of paint on an automobile. Further, mobile paint booth 100 can be made of fire-retardant material such as a PVC tarpaulin.

Inflatable frame 101 can provide structure to mobile paint booth 100. Inflatable frame 101 can allow mobile paint booth 100 to be portable and easy to set-up. Inflatable frame 101 can comprise a plurality of vertical supports 101a, in one embodiment. Each vertical support 101a can be placed at the opposite sides of mobile paint booth 100 and positioned parallel to each other. In another embodiment, inflatable frame 101 can comprise a base support 101b, a first set of upper beams 101c, a second set of upper beams 101d, and one or more horizontal beams 101e. Roof 102 can be connected at the top portion of inflatable frame 101. As such, roof 102 can serve as a top covering for the inner portion of mobile paint booth 100. In one embodiment, roof 102 can comprise of translucent materials that can allow natural lights to enter mobile paint booth 100. Floor 103 can be connected at the bottom portion of inflatable frame 101. Therefore, floor 103 can serve as a bottom covering for the inner portion of mobile paint booth 100. In one embodiment, floor 103 can comprise a durable plastic sheeting material that can include but is not limited to high-density polyethylene. As such, floor 103 can withstand high temperatures. Moreover, HDPE can protect the ground or the outer surroundings from the chemicals that can be used within mobile paint booth 100.

Wall sections 104 can be connected at each opposite sides of inflatable frame 101. Further, in one embodiment, roof 102, floor 103, and wall sections 104 can comprise of a durable sheet material such as plastic, or fabric that can include but are not limited to PVC tarpaulins or oxford nylon. Furthermore, inflatable frame 101, roof 102, floor 103, and wall sections 104 can define an interior space 105 and an exterior space 106. As such interior space 105 can be the working space created within mobile paint booth 100 while exterior space 106 can be the outer portion surrounding mobile paint booth 100.

Figure 2:
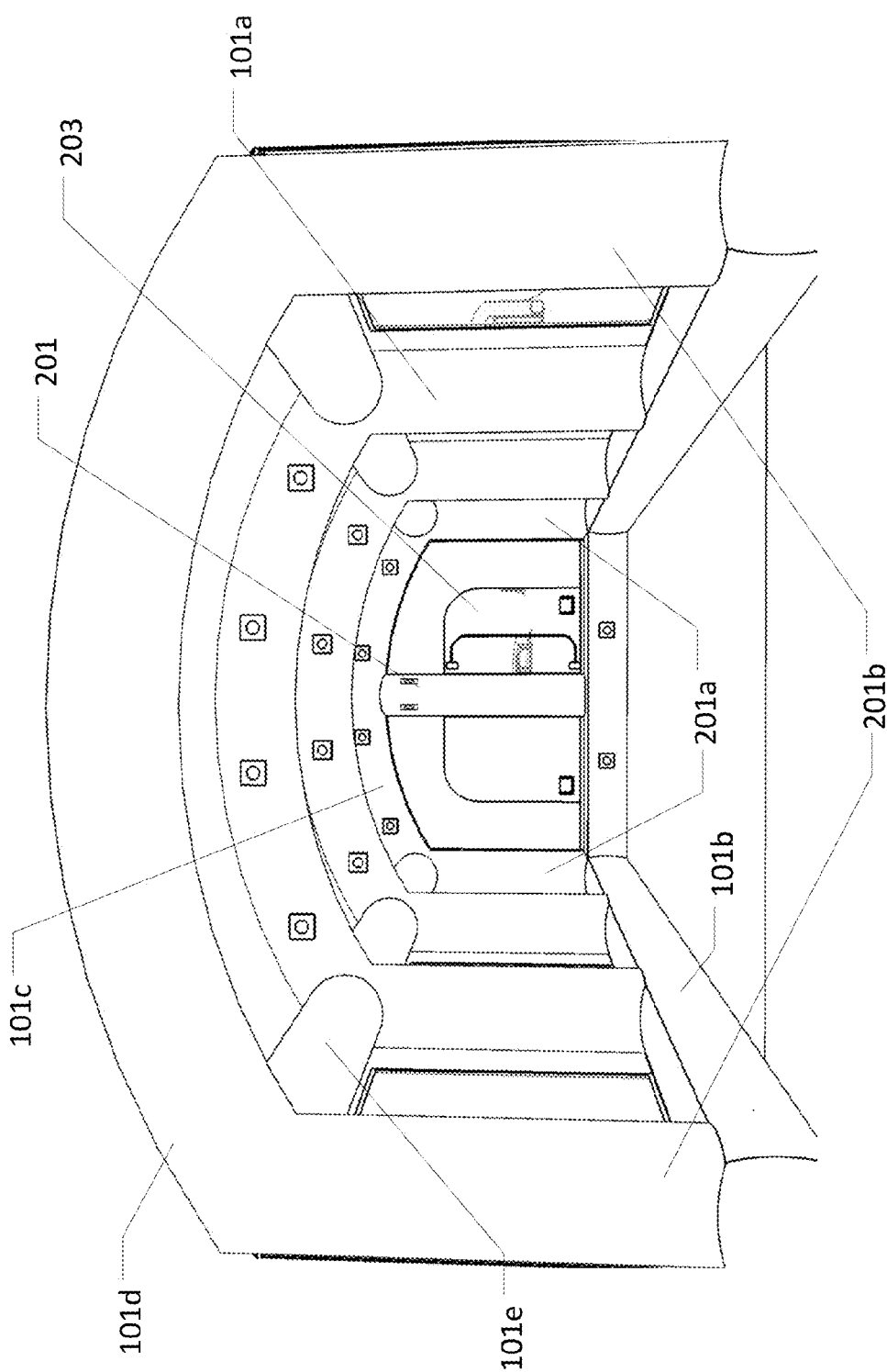
FIG. 2 illustrates inflatable frame within interior space of mobile paint booth.

FIG. 2 illustrates inflatable frame 101 within interior space 105 of mobile paint booth 100. In this embodiment, vertical supports 101a can define the vertical boundaries of interior space 105 and exterior space 106. In one embodiment, vertical supports 101a can comprise corner supports 201, and middle supports 202 between corner supports 201. Corner supports 201 and middle support 202 can be along a first wall 203. Base support 101b can substantially in the shape of a "U". Base support 101b can connect each of vertical supports 101a at the bottom. In one embodiment, the base of the "U" of base support 101b can be along the bottom of first wall 203. First upper beam 101c can connect a first set of corner support 201a and middle support 202. Second upper beam 101d can connect a second set of corner support 201b. Additionally, second set of corner support 201b can be along a second wall 204. Horizontal beams 101e can connect first upper beam 101c and second upper beam 101d together. Further, upper beams 101c and 101d can form an arc at the top portion of mobile paint booth 100, in one embodiment. Further, middle support 202 in between base support 101b and first upper beam 101c can form an I-shape structure. Such exemplary structure can allow mobile paint booth 100 to have a better wind resistance while still allowing for a vehicle to pass within device. In one embodiment, vertical supports, base support, upper beams, and upper horizontal beams and upper beams can be connected to together such that air can pass between them, and they inflate and deflate together.

In another embodiment, additional middle supports 202 can be between other corner supports. In one embodiment, pairs of middle supports on opposite sides of mobile paint booth 100 can be connected by additional upper beams 101c. In one embodiment, upper beams 101c can all be parallel with each other.

Figure 3:
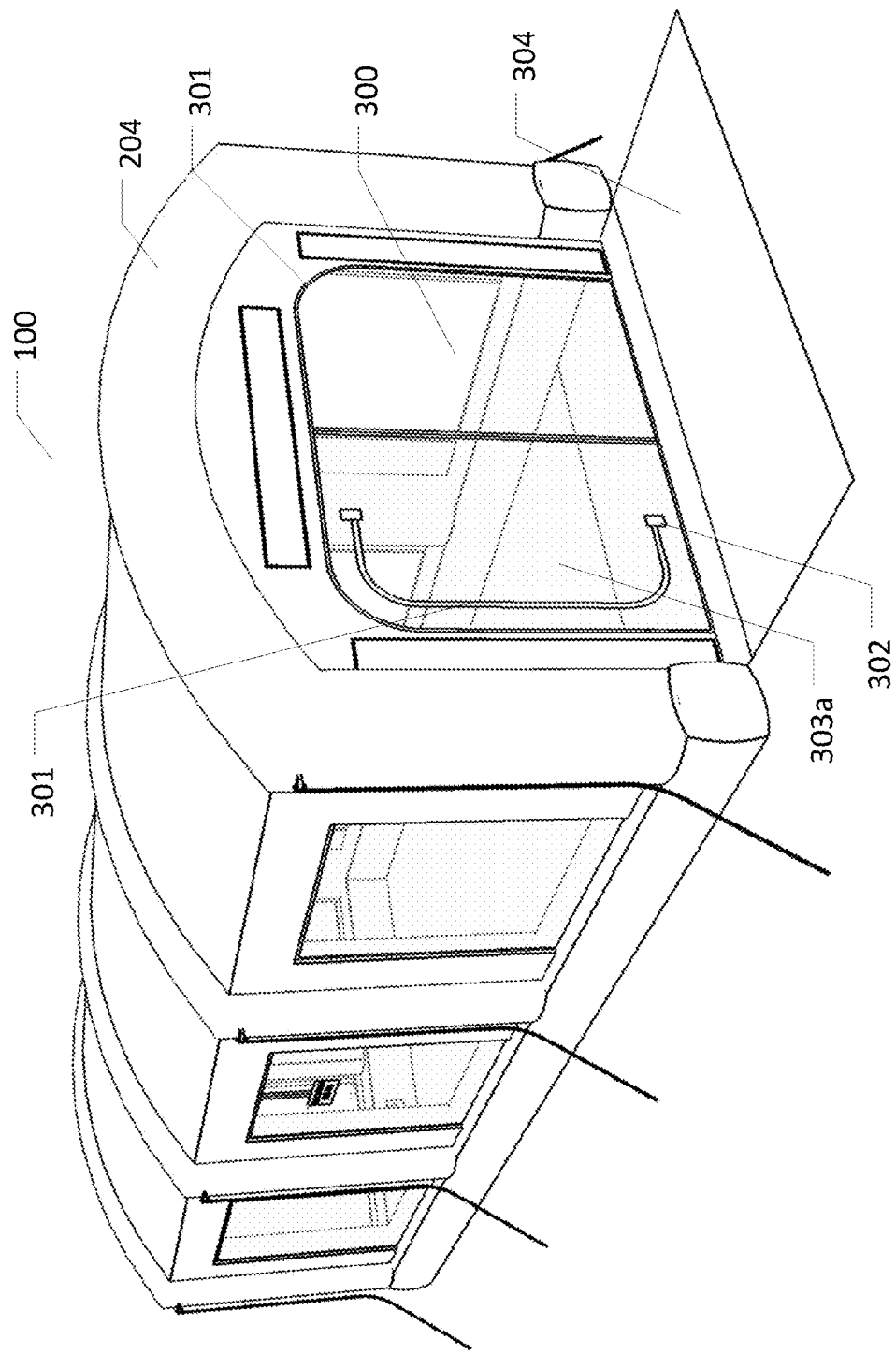
FIG. 3 illustrates second wall comprising an entry port.

FIG. 3 illustrates second wall 204 comprising an entry port 300. Entry port 300 can be a re-sealable opening accessible to an automobile. As such, entry port 300 can comprise a cut 301 that is big enough to fit an automobile. Cut 301 can be a division made on a surface that provides an opening to an object or person. In one embodiment, cut 301 can be made at the top of the surface then down at the opposite sides. In this embodiment, cut 301 can form an inverted U-shape. In another embodiment, cut 301 can be made from the bottom of the surface then upward at the opposite sides. In such embodiment, cut 301 can form a U-shape. Further in another embodiment, cut 301 can be made on one side, top, and bottom. As such, cut 301 can form a C-shape. Furthermore in some embodiments, cut 301 can be in a T-shape or an L-shape.

Further as an exemplary structure, cut 301 of entry port 300 can be in an inverted U-shape. Moreover, cut 301 can be connected with wall sections 104 through a zip fastener 302. In this embodiment, entry port 300 can further comprise a first door 303a, and a mat 304. Door 303a can be a re-sealable passage that is used to enter and/or exit mobile paint booth 100. As such door 303a can also comprise cut 301 on entry port 300 that can be fastened with zip fastener 302. Mat 304 can be a durable sheet material such as plastic or fabric and is placed directly below entry port 300. Moreover, mat 304 can extend from interior space 105 to exterior space 106. As such, mat 304 can be used to protect entry port 300 when entry port 300 is unzipped from second wall 204 by lying over entry port 300 if entry port 300 is lying on the ground.

FIG. 4A illustrates one or more exhaust panels 401 mounted on wall section 104. In one embodiment, exhaust panels 401 can be placed around entry port 300. Furthermore, each exhaust panel 401 can comprise a filter 402. Filter 402 can prevent passing impurities and solid particles, while allowing clean air to pass through exhaust panel 401. Further in one embodiment, filter 402 can be replaceable with a new filter 402.

Figure 4B:
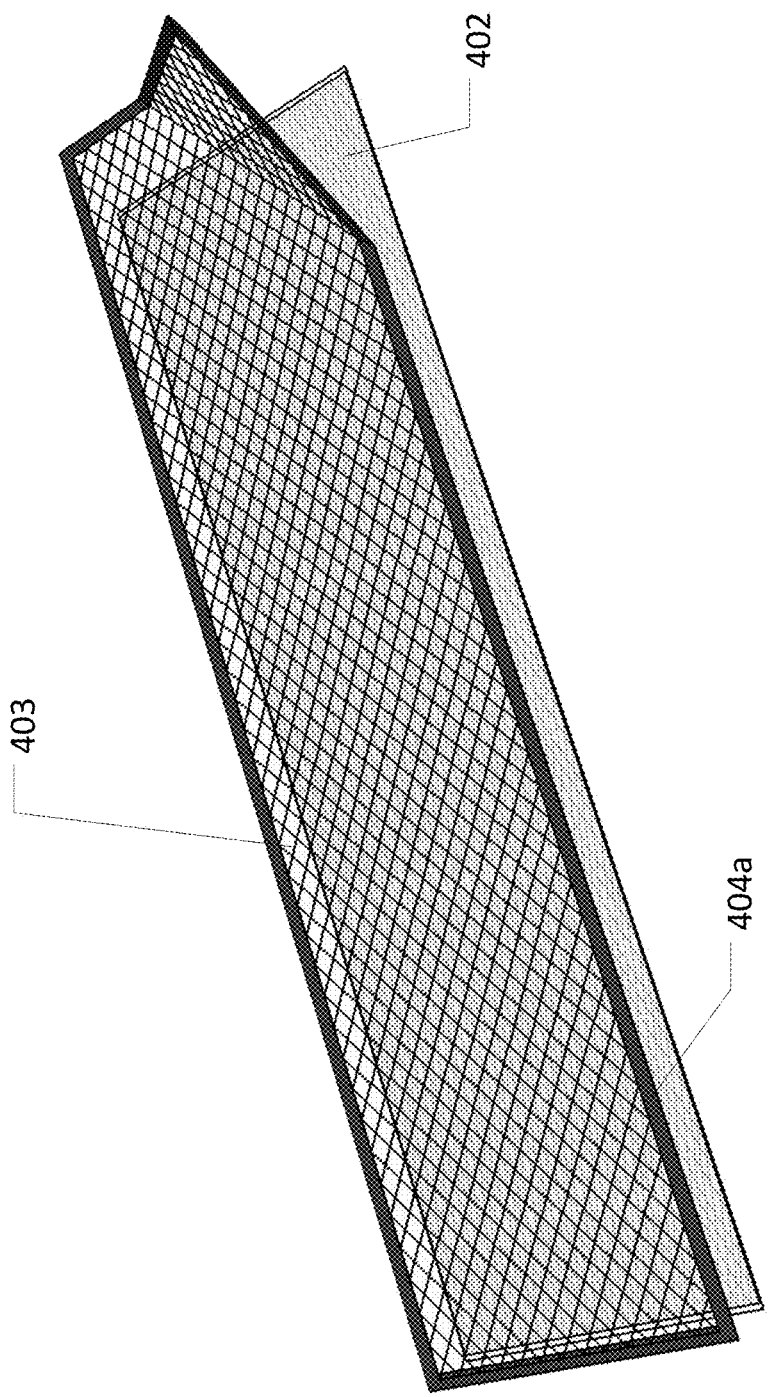
FIG. 4B illustrates filter comprising a sheet barrier.

FIG. 4B illustrates filter 402 comprising a sheet barrier 403. Sheet barrier 403 can hold filter 402 in place on wall section 104. In one embodiment, filter 402 can be permanently attached with sheet barrier 403 through methods that can include but are not limited to sewing, or through use of adhesive materials. Furthermore, sheet barrier 403 can be attachable to a surface of wall section 104 through a fastening device 404. Fastening device 404 can include but is not limited to a zipper, hook and eye, snap fasteners, and/or a hook and loop fastener. In such embodiment, one side of sheet barrier 403 can comprise a first fastening device 404a.

FIG. 4C illustrates the inner surface of second wall 204 comprising exhaust panel 401. To connect sheet barrier 403 with second wall 204, a second fastener 404b mateable with first fastening device 404a can be attached at the inner surface of second wall 204 over an exhaust orifice 401a. As such, second fastener 404b can be placed around the edges of exhaust panel 401. In this embodiment, the position of first fastener 404a can be compatible with the position of second fastener 404b. In such embodiment, filter 402 can be attached to exhaust panel 401 by fastening first fastener 404a in sheet barrier 403 with second fastener 404b on second wall 204.

FIG. 4D illustrates an external view of exhaust panels 401 comprising a flap 405. Flap 405 can allow air coming out from exhaust panels 501 to move in one direction. In this embodiment, flap 405 can direct the air from exhaust panels 501 to go upward. As such, the outer edges of flap 405 can be permanently attached to second wall 204, leaving only the top edge of flap 405 open. Furthermore, the outer edges of flap 405 can connect to second wall 204 through methods that can include but are not limited to sewing, or use of adhesive materials.

Figure 5:
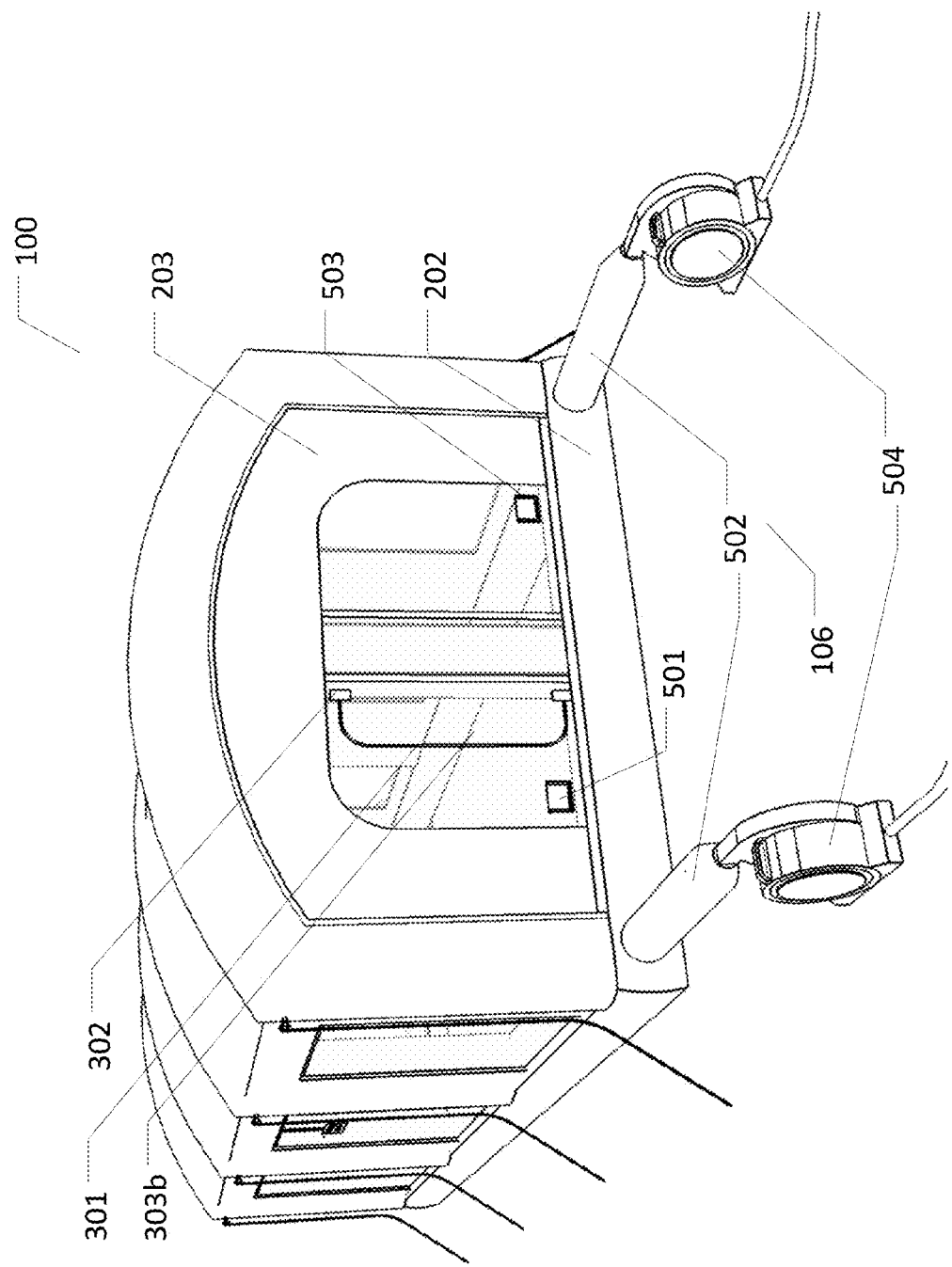
FIG. 5 illustrates first wall comprising a second door, one or more orifices, and a pair of air inlets.

FIG. 5 illustrates first wall 203 comprising a second door 303b, one or more orifices 501, and a pair of air inlets 502. Orifices 501 can be a re-sealable opening that comprises cut 301 placed at the bottom portion of first wall 203, in one embodiment. In such embodiment, orifices 501 can comprise a fastener 503. Furthermore, orifices 501 can allow air pressured devices and tools such as a hose to pass through first wall 203. For purposes of this disclosure, fastener 503 can be a device that can temporarily connect and/or separate two objects together. Thus, fastener 503 can include but is not limited to zipper and/or a hook and loop fastener.

Air inlet 502 can allow air from exterior space 106 to enter and fill up inflatable frame 101. As such, air inlet 502 can be placed at the outer surface of inflatable frame 101. Moreover, air inlet 502 can be connectable to an air pump 504. In one embodiment, air inlet 502 can be placed at the bottom. In such embodiment, air inlet 502 can be connected to base support 101b.

Figure 6:
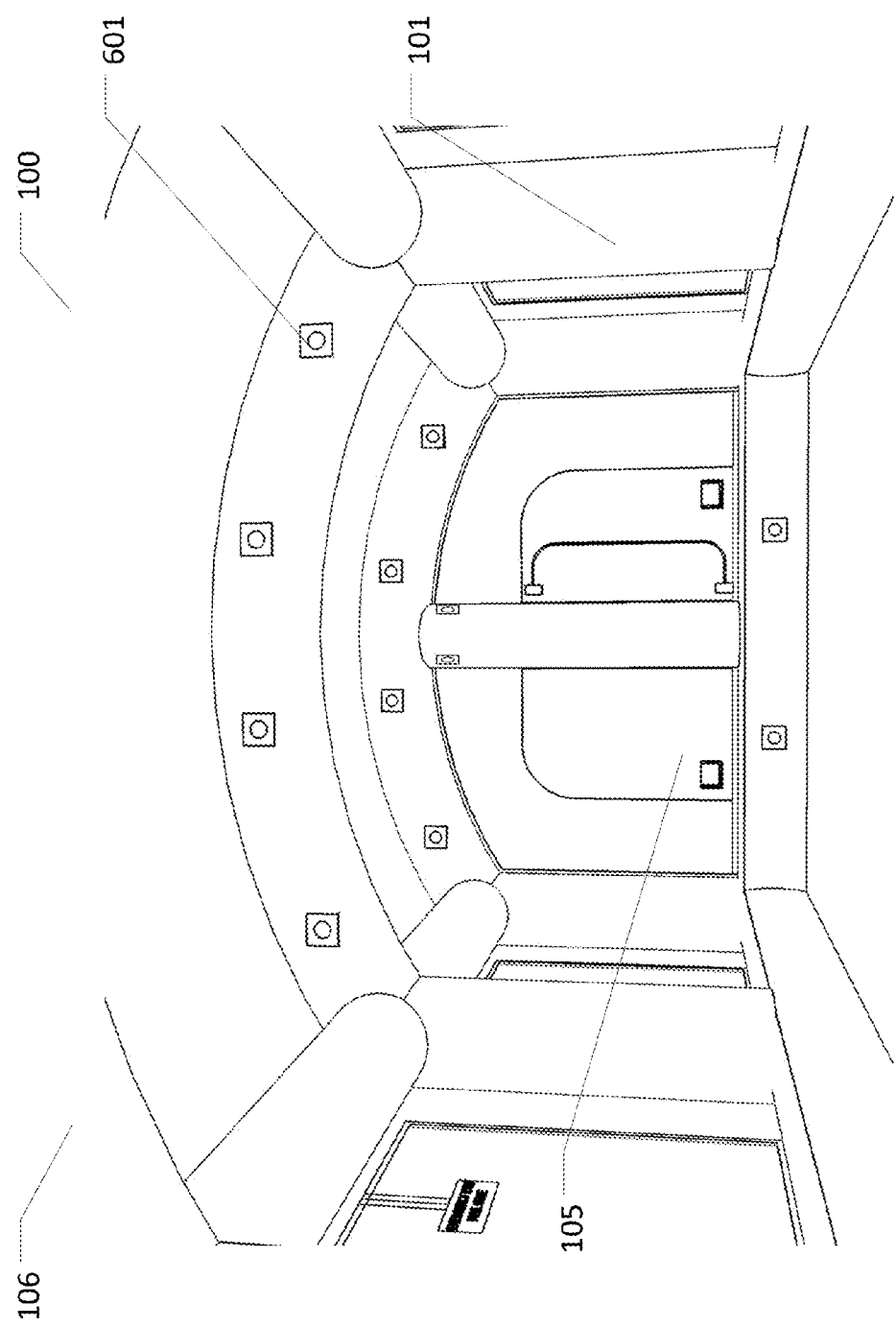
FIG. 6 illustrates internal view of mobile paint booth wherein inflatable frame comprises a plurality of air vents.

FIG. 6 illustrates internal view of mobile paint booth 100 wherein inflatable frame 101 comprises a plurality of air vents 601. Air vents 601 can be openings that allow air to flow through within interior space 105. As such, air vents 601 can allow the air that is pumped from exterior space 106 to enter interior space 105. Moreover, air vents 601 can capture and contain chemical particulates within interior space 105 thus reducing the harmful effects of an automobile paint. In one embodiment, air vents 601 can be pointed in a common direction, such as toward exhaust panels 401. In such embodiment air can pass through interior space 105 in a unidirectional movement.

Air pump 504 must be sized according to the characteristics of mobile paint booth 100. For example, if mobile paint booth 100 is 16'×16'×9', with twelve air vents 601 each around 3"×3", then one or more air pumps capable of pushing around 5,000 cfm of air will be sufficient to support mobile paint booth, not damage the booth, and also maintain sufficient air turnover within interior space 105. At a minimum air within interior space 105 should turn completely at least once every twenty minutes.

Figure 7:
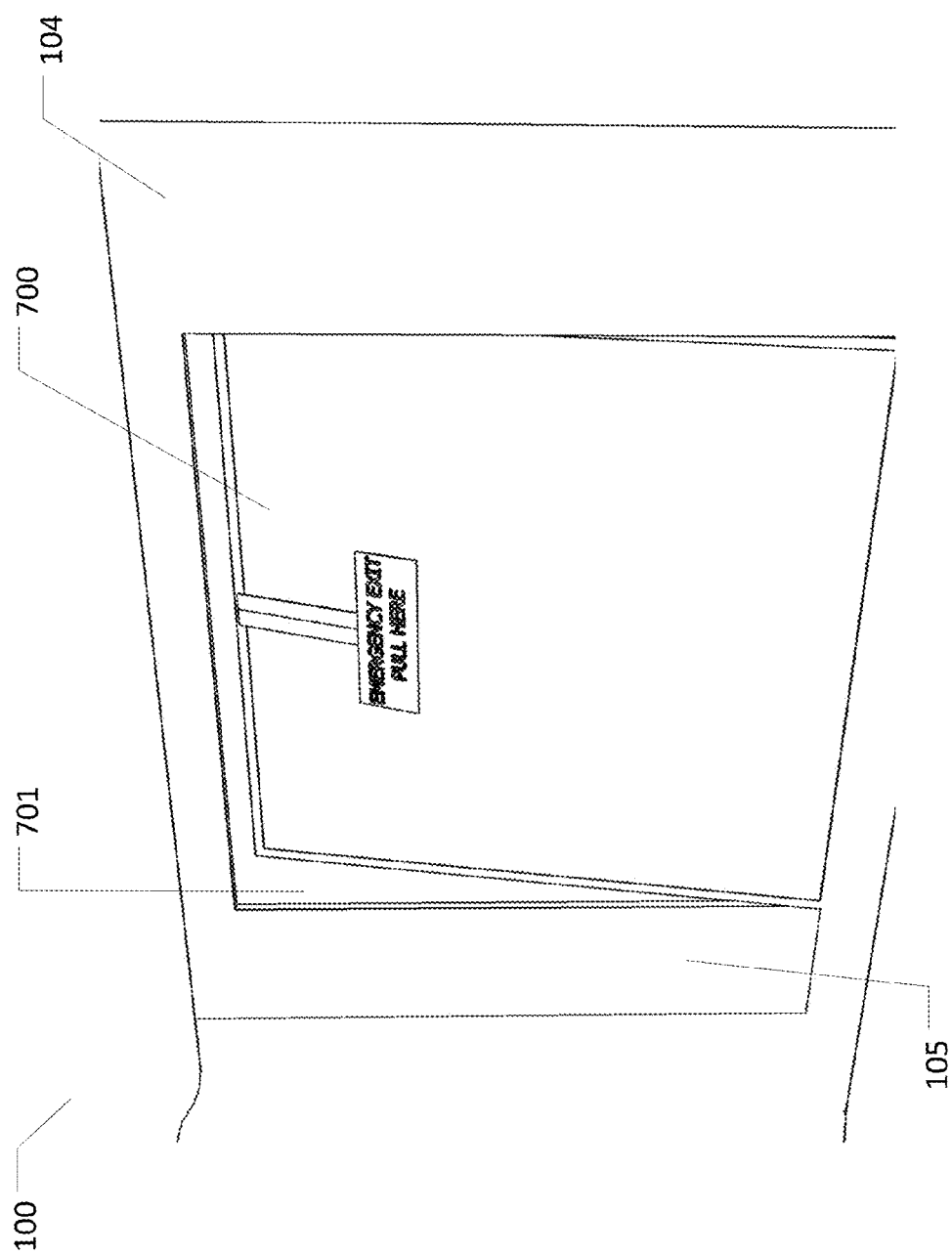
FIG. 7 illustrates an emergency exit placed in one or more wall sections.

FIG. 7 illustrates an emergency exit 700 placed in one or more wall sections 104. Emergency exit 700 can be used as an accessible and quick escape from mobile paint booth 100. Moreover, emergency exit 700 can be a panel connected with wall section 104 through a quick release fastener 701 that can include but is not limited to a hook and loop fastener. As such, emergency exit 700 can be used to seal an opening 701 on wall sections 104. In this embodiment, a quick-pull handle 702 made on emergency exit 700 can provide a quick escape from interior space 105 of mobile paint booth 100. Further in one embodiment, emergency exit 700 can comprise of a transparent material that can serve as a window to workers that is within mobile paint booth 100.

FIG. 8 illustrates an external view of mobile paint booth 100 comprising a plurality of ropes 801. Ropes 801 can be used in tying down mobile paint booth 100 to the ground. In scenarios wherein mobile paint booth 100 can be installed in areas with strong winds, ropes 801 can ensure that mobile paint booth 100 is secured in place. Ropes 801 can be equally distributed at the opposite sides of mobile paint booth 100. As such, ropes 801 can be placed at the opposite wall sections 104. In one embodiment, ropes 801 can be permanently attached to wall section 104. In such embodiment, ropes 801 can be connected to wall section 104 through sewing or through use of adhesive materials. In another embodiment, ropes 801 can be connected to ropes 801 through a hook device 802. In this embodiment, hook device 802 can be permanently attached at the outer surface of wall sections 104. As such, one end of ropes 801 can be tied onto hook device 802 while the other end of ropes 801 can be tied to the ground. Further in one embodiment, the other end of each rope 801 can comprise a peg 803 that can secure fixed into the ground.

Figure 9A:
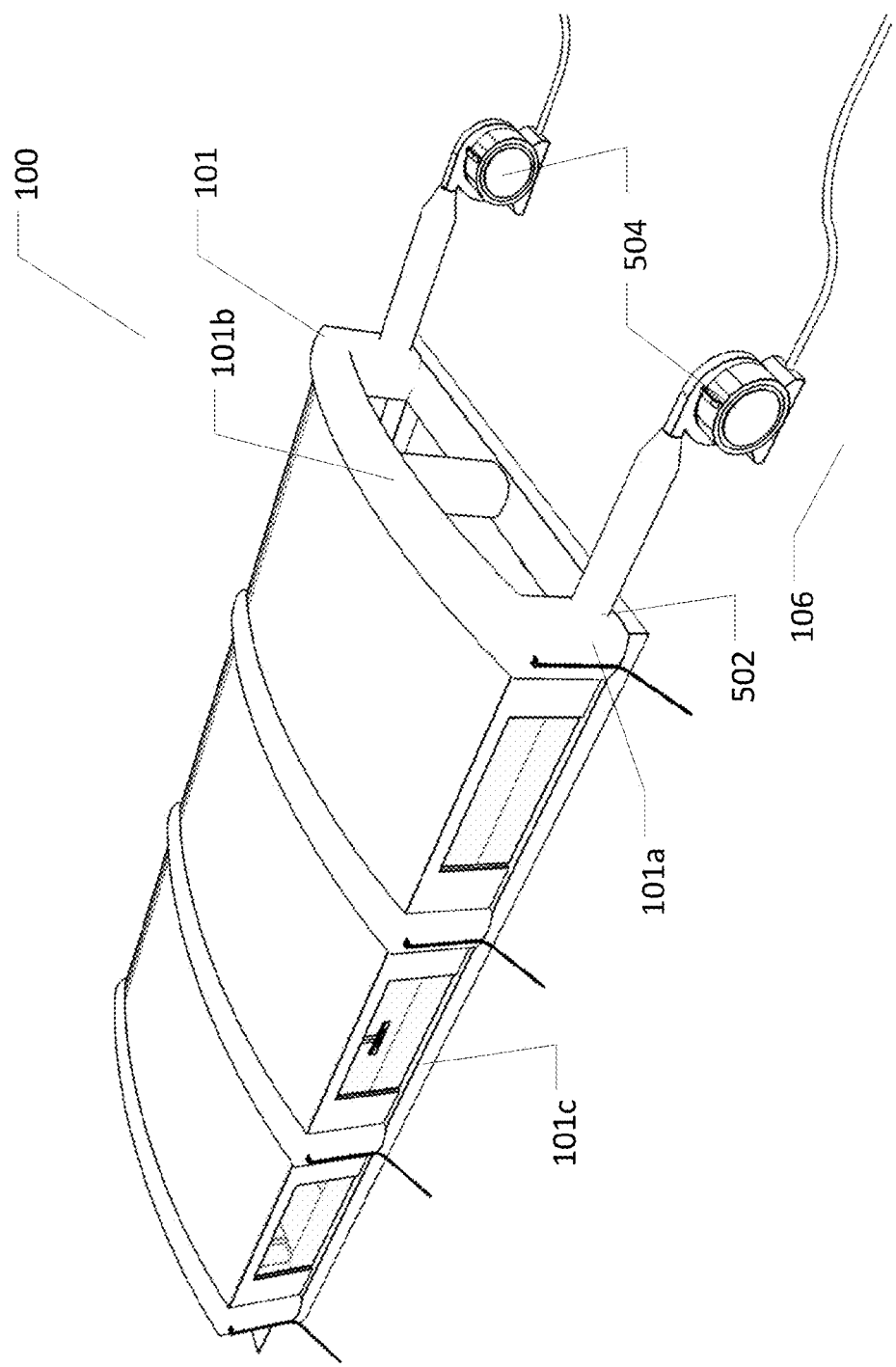
FIG. 9A illustrates how mobile paint booth can be expanded.

FIG. 9A illustrates how mobile paint booth 100 can be expanded. Mobile paint booth 100 can be inflated through air pump 504 that can be connected to air inlets 502. As such, the air exterior space 106 can be pushed into inflatable frame 101.

Figure 9B:
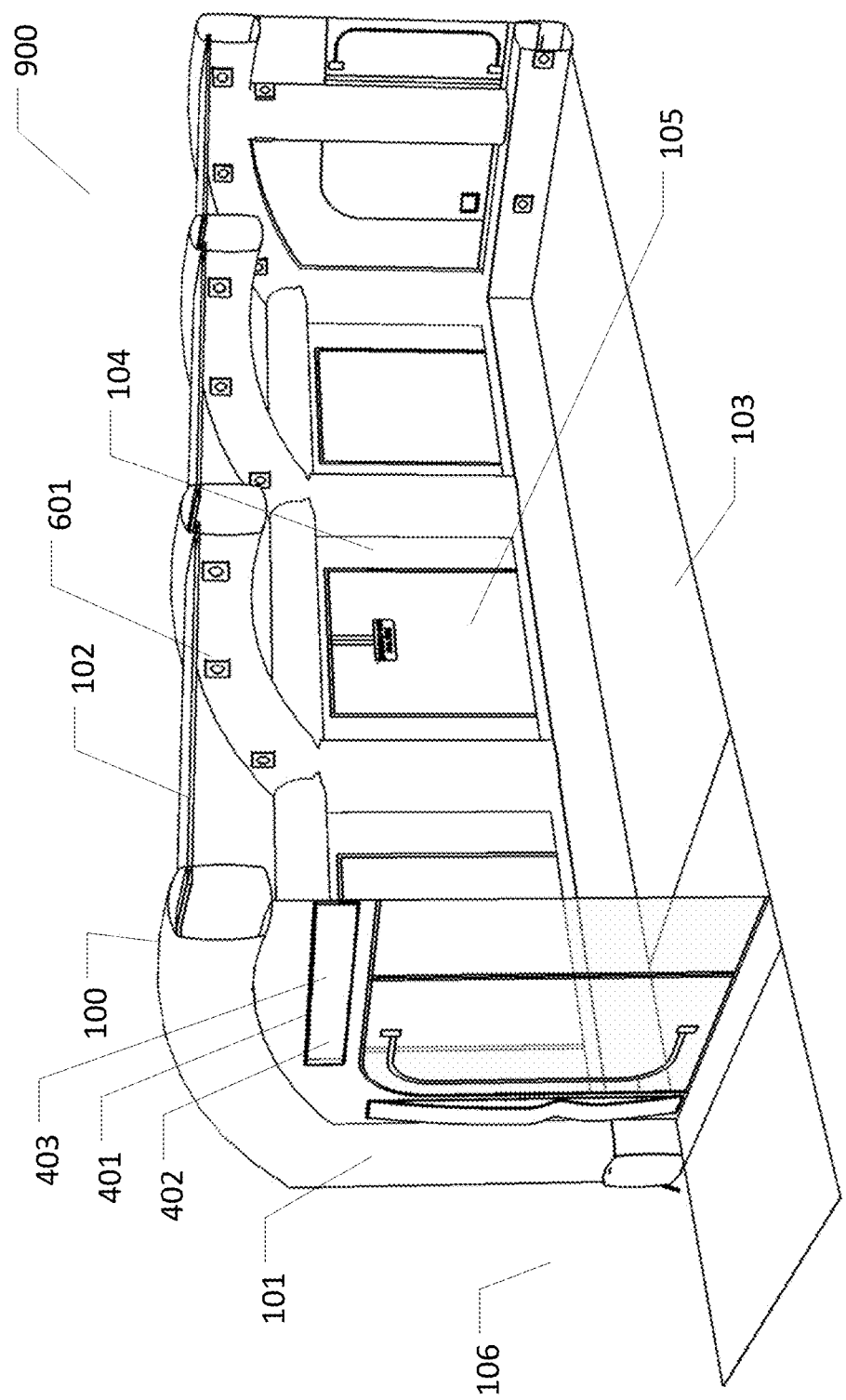
FIG. 9B illustrates internal view of mobile paint booth at an expanded state.

FIG. 9B illustrates internal view of mobile paint booth 100 at an expanded state 900. As the air from exterior space 106 gets pumped into mobile paint booth 100, roof 102, floor 103 and walls 104 can start to expand together with inflatable frame 101. Moreover, since inflatable frame 101 comprises air vents 601, the air within inflatable frame 101 can be pushed out from air vents 601. This can allow positive air pressure to enter bed liner booth 100 and preventing other particulates to enter interior space 105. Furthermore, since air vents 601 can be placed on one side surface of inflatable frame 101, the air gets directed into interior space 105 in one direction only. As such in one embodiment, exhaust panels 401 can be positioned facing the direction of said air vents 601. In such embodiment, the air is directed from one side of interior space 105 and flows through the direction of exhaust panels 401. This structure can be advantageous in a sealed space since the unidirectional movement of air can enable the worker to get maximum efficiency in air turn-over and pulling contaminants toward a filter when applying paint to an automobile. Moreover such structure can provide better airflow within mobile paint booth 100. Further, since exhaust panels 401 can comprise filters 402, the air can first be filtered through exhaust panels 401, prevent potential contamination of exterior space 106. Lastly, the air that goes out through exhaust panels 401 can then be directed upwards by flaps 403.

Figure 9C:
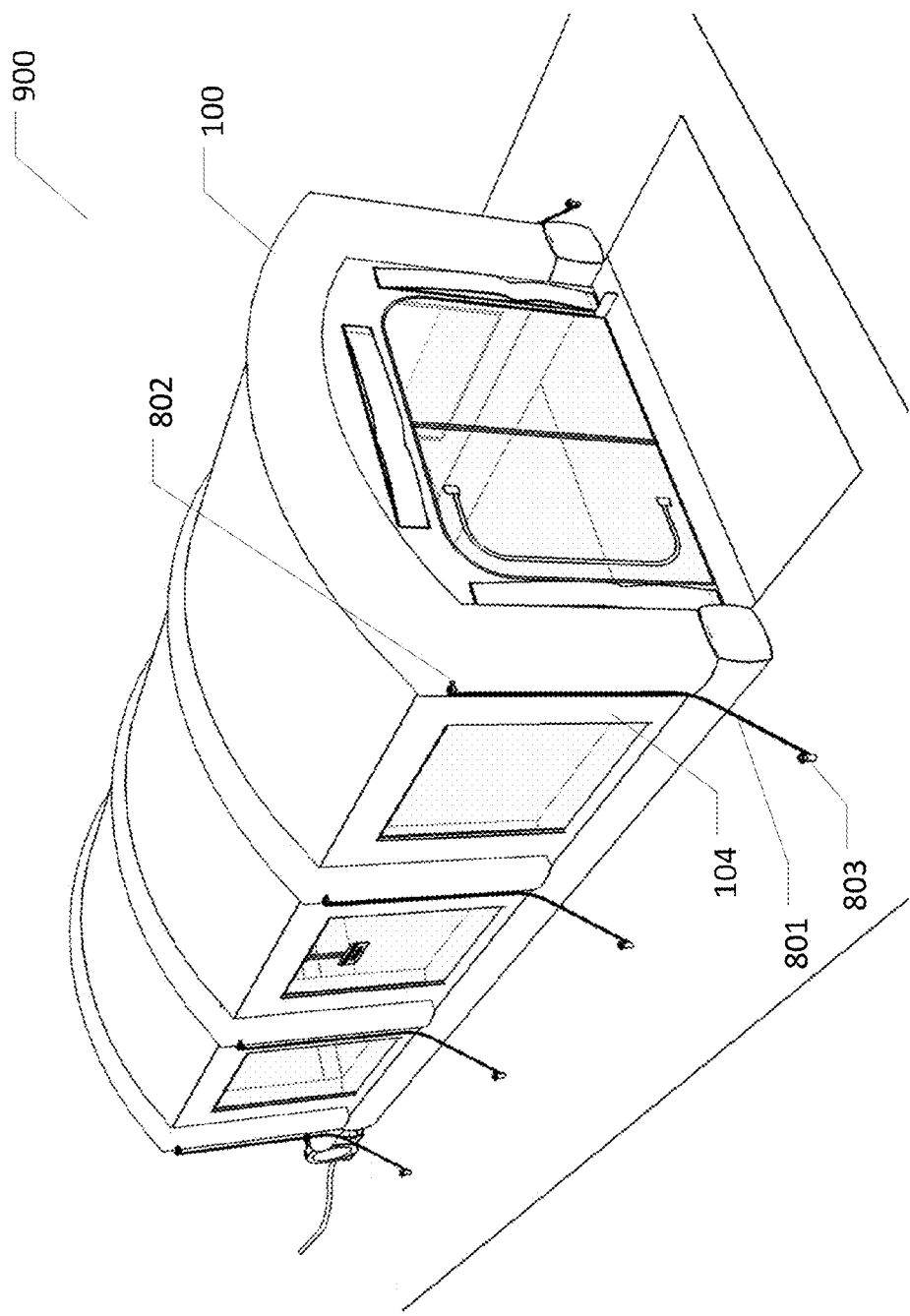
FIG. 9C illustrates how mobile paint booth can be secured in place.

FIG. 9C illustrates how mobile paint booth 100 can be secured in place. Once mobile paint booth 100 is fully inflated and is at expanded state 900, ropes 801 at the opposite wall section 104 can be tied into a sturdy or permanent structure or can be fastened into the ground. In an embodiment wherein each rope 801 can comprise peg 803, peg 803 can be used to bore the other end of rope 801 into the ground. As such, securing mobile paint booth 100 in place.

Figure 9D:
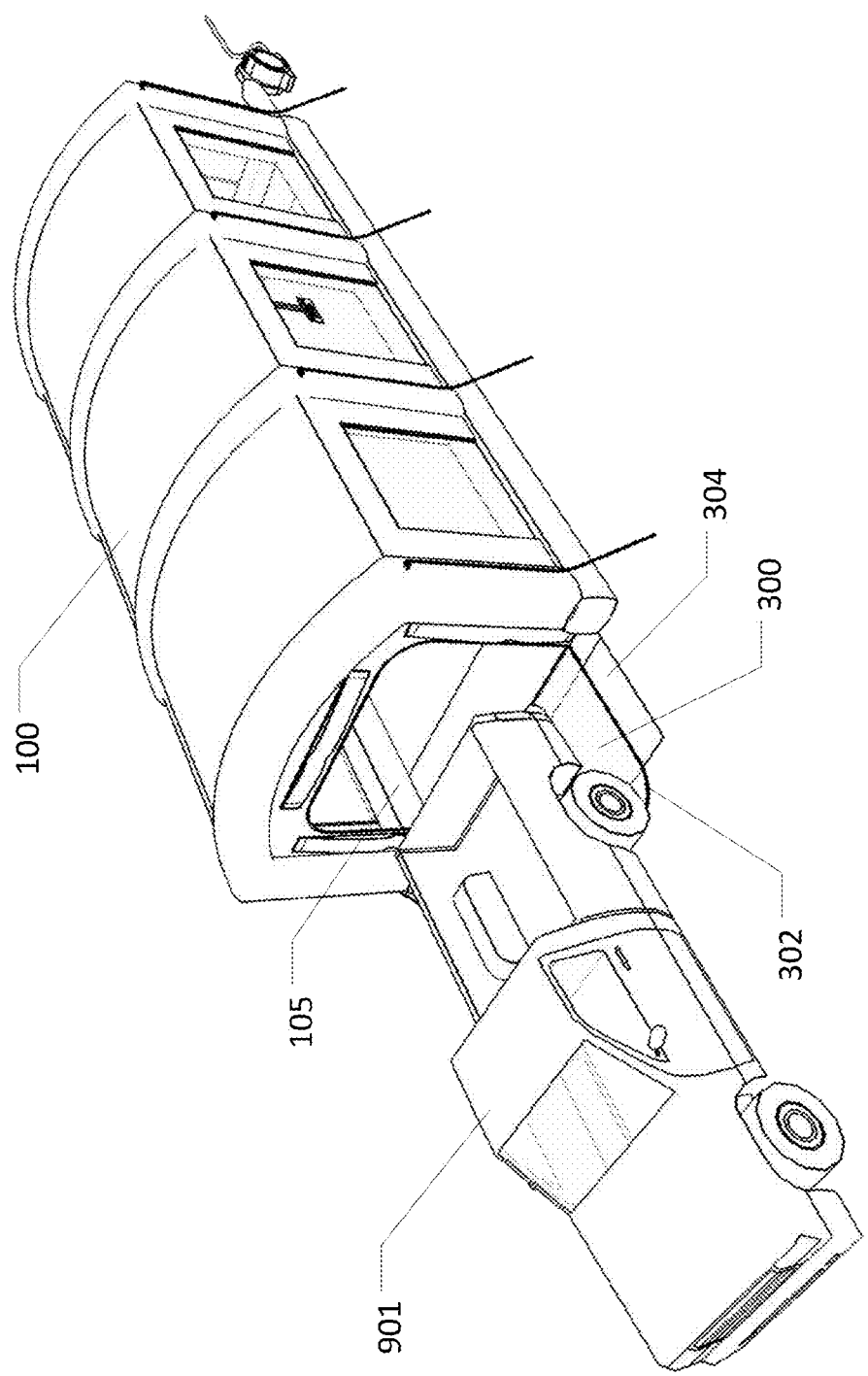
FIG. 9D illustrates an automobile being maneuvered into mobile paint booth.

FIG. 9D illustrates an automobile 901 being maneuvered into mobile paint booth 100. After mobile paint booth 100 is secured in place, automobile 901 can be maneuvered into entry port 300. Entry port 300 can be opened by unfastening zip fastener 302 from second wall 204. Mat 304 can be used as a cover to protect entry port 300 as automobile 901 is maneuvered into interior space 105.

Figure 9E:
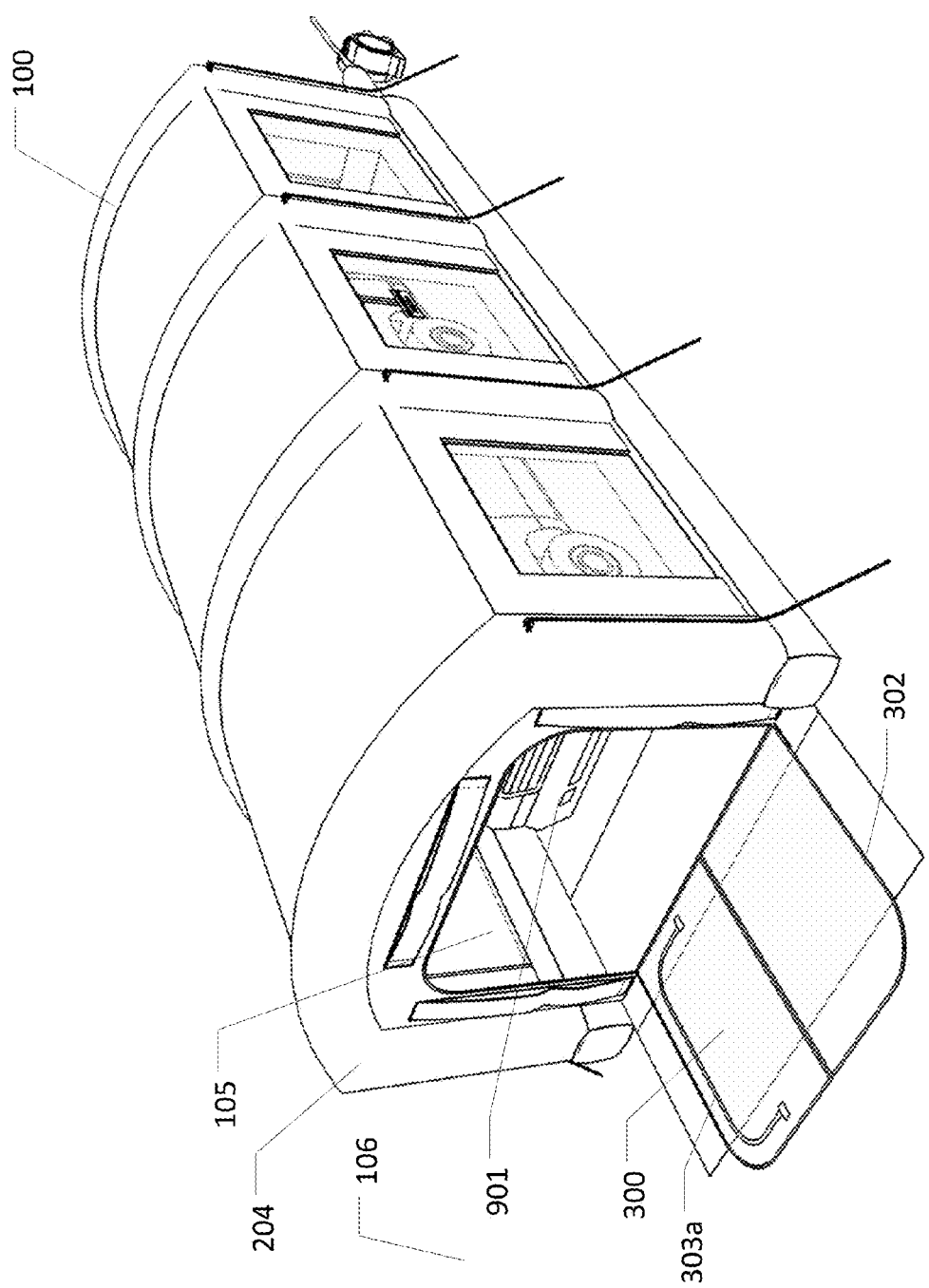
FIG. 9E illustrates automobile within mobile paint booth.

FIG. 9E illustrates automobile 901 within mobile paint booth 100. Once automobile 901 is positioned within interior space 105, entry port 300 can be sealed again to protect interior space 105 from being exposed to contaminants that are present in exterior space 106. Thus, zip fastener 302 can be used to bind entry port 300 with second wall 204, completely sealing interior space 105 from exterior space 106. In an embodiment wherein entry port 300 can comprise first door 303a, workers or the driver of automobile 901 can use first door 303a to enter and/or exit from mobile paint booth 100.

FIG. 9F illustrates external view of first wall 203 comprising second door 303b and orifices 501. In such structure, workers can also access second door 303b from first wall 203. As such, doors 303 can also be fastened back in place through zip fastener 302 after workers enter and/or exit mobile paint booth 100. This is to ensure that interior space 105 is sealed from the particulates in exterior space 106. Furthermore, air pressured device such as a hose can be inserted within mobile paint booth 100 through orifices 501 in first wall 203.

Figure 9G:
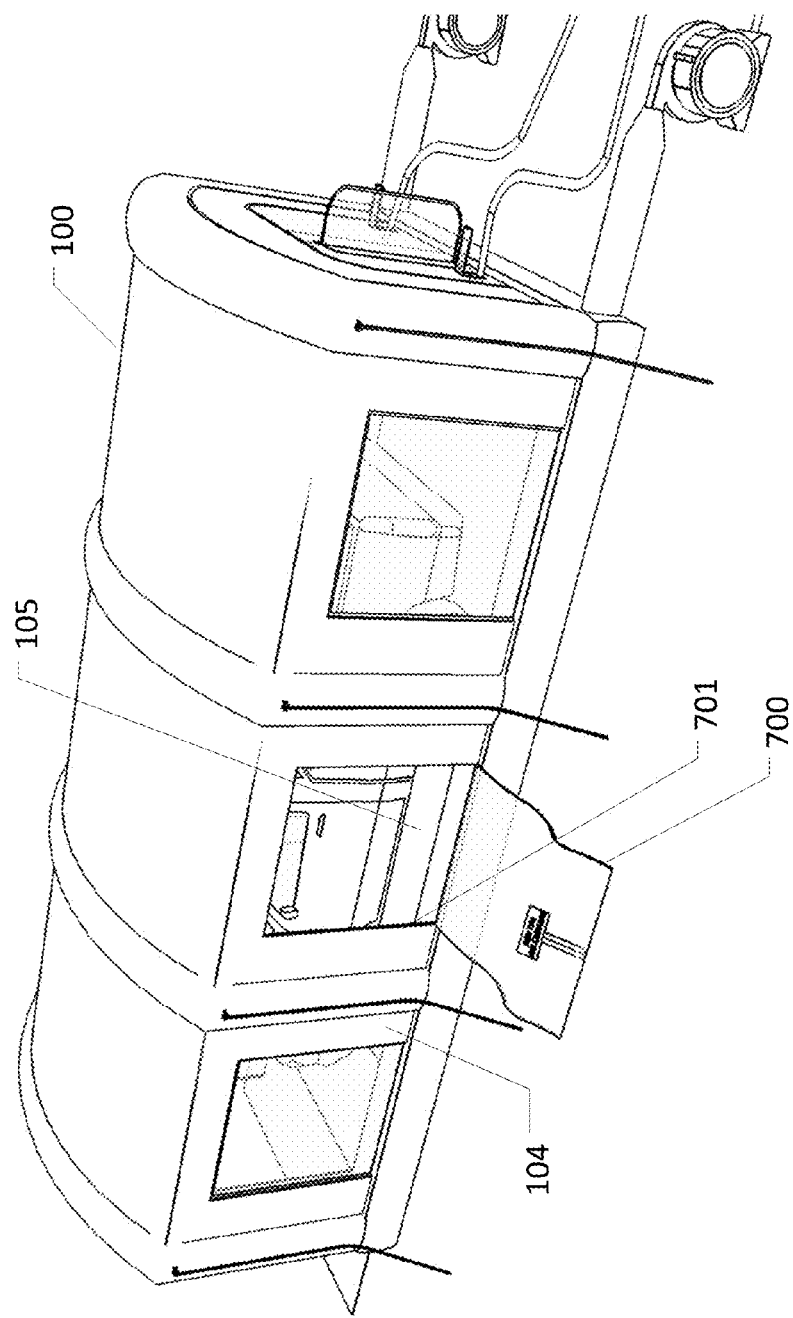
FIG. 9G illustrates emergency exit in one of wall section.

FIG. 9G illustrates emergency exit 700 in one of wall section 104. In a scenario wherein workers need to exit out from mobile paint booth 100 immediately, the workers within interior space 105 can pull quick-pull handle 702 to open emergency exit 700 from wall section 104. Since emergency exit 700 can be connected to wall section 104 through a hook and loop fastener, a quick pull on emergency exit 700 can expose opening 701, allowing workers to easily get out from mobile paint booth 100.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A mobile booth comprising:
   an inflatable structure, said inflatable structure comprising:
      first and second spaced vertically extending inflatable corner supports, each of said first and second corner supports having an upper end;
      a first generally horizontally extending inflatable beam connected to said first and second corner supports at their upper ends to form a first frame;
      third and fourth vertically extending inflatable corner supports spaced from said first and second corner supports, respectively, each of said third and fourth corner supports having an upper end;
      a second generally horizontally extending inflatable beam connected to said third and fourth corners supports at their upper ends to form a second frame, said first beam having a generally vertically extending surface facing said second frame;
      a peripherally extending wall system connected to said vertical supports, said wall system including a portion extending between said third and fourth corner supports; and
      a roof system connected to said crossbeams and portions of said wall system to form an enclosure;
   at least one air outlet positioned in said vertically extending surface of said first beam;
   at least one exhaust panel positioned in said portion of said wall system between said third and fourth corner supports, whereby air flowing out of said air outlet flows in a generally unidirectional horizontal direction toward said exhaust panel.

2. The mobile booth of claim 1, wherein said inflatable structure further comprises:
   a first vertically extending intermediate inflatable support between said first and third corner supports, said first intermediate support having an upper end; and
   a second vertically extending intermediate inflatable support between said second and fourth corner supports, said second intermediate support having an upper end.

3. The mobile booth of claim 2, wherein there is a first intermediate beam connected to the upper ends of said first and second intermediate supports.

4. The mobile booth of claim 1, wherein said wall portion between said third and fourth corner supports comprise an entry port large enough for an automobile to pass and there is a selectively moveable panel over said entry port which can be moved from an open to a closed position.

5. The mobile booth of claim 1, wherein said wall system comprises one or more orifices, said orifices capable of receiving an air-pressured device.

6. The mobile booth of claim 1, wherein said wall system comprises one or more emergency exits.

7. The mobile booth of claim 1, further comprising a plurality of tethers connected to said structure to anchor said structure to the ground.

* * * * *